US011618472B2

(12) United States Patent
Heo et al.

(10) Patent No.: US 11,618,472 B2
(45) Date of Patent: Apr. 4, 2023

(54) ELECTRONIC DEVICE FOR CONTROLLING DRIVING OF VEHICLE AND OPERATION METHOD THEREOF

(71) Applicant: AGENCY FOR DEFENSE DEVELOPMENT, Daejeon (KR)

(72) Inventors: Ji Seong Heo, Daejeon (KR); Hyoung Woo Lim, Daejeon (KR); Young Sook Shin, Daejeon (KR); Tae Yoon Chun, Daejeon (KR); Sang Ho Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 17/721,677

(22) Filed: Apr. 15, 2022

(65) Prior Publication Data

US 2022/0332345 A1 Oct. 20, 2022

(30) Foreign Application Priority Data

Apr. 16, 2021 (KR) .................. 10-2021-0050055

(51) Int. Cl.
*B60W 60/00* (2020.01)
*B60W 10/04* (2006.01)
*B60W 10/20* (2006.01)
*G06V 10/82* (2022.01)
*G06V 20/56* (2022.01)

(52) U.S. Cl.
CPC .......... *B60W 60/001* (2020.02); *B60W 10/04* (2013.01); *B60W 10/20* (2013.01); *B60W 2420/42* (2013.01); *B60W 2420/52* (2013.01); *G06V 10/82* (2022.01); *G06V 20/56* (2022.01)

(58) Field of Classification Search
CPC .... B60W 60/001; B60W 10/04; B60W 10/20; B60W 2420/42; B60W 2420/52; G06V 10/82; G06V 20/56; G06V 10/776
USPC .......................................................... 701/23
See application file for complete search history.

(56) References Cited

U.S. PATENT DOCUMENTS

| 9,710,714 | B2* | 7/2017 | Chen .......................... G06T 7/44 |
| 10,331,133 | B2 | 6/2019 | Lombrozo et al. |
| 2011/0257876 | A1* | 10/2011 | Yokota .................. B60W 40/13 |
| | | | 701/124 |
| 2018/0022382 | A1* | 1/2018 | Akatsuka ............... B62D 5/008 |
| | | | 701/41 |
| 2018/0225813 | A1* | 8/2018 | Yokota .................... G06V 20/56 |
| 2018/0232585 | A1* | 8/2018 | Kim ...................... G06V 20/584 |
| 2019/0217854 | A1* | 7/2019 | Park ..................... B60W 30/045 |
| 2019/0351899 | A1* | 11/2019 | Adam ............... B60W 50/0097 |
| 2020/0023901 | A1* | 1/2020 | Modig ............... B62D 15/0265 |
| 2020/0139989 | A1* | 5/2020 | Xu ......................... B60W 10/04 |

(Continued)

FOREIGN PATENT DOCUMENTS

| KR | 101705961 B1 | 2/2017 |
| KR | 20180094725 A | 8/2018 |
| KR | 20200040142 A | 4/2020 |

(Continued)

*Primary Examiner* — Jonathan M Dager
*Assistant Examiner* — Jean W Charleston
(74) *Attorney, Agent, or Firm* — Miles & Stockbridge P.C.

(57) ABSTRACT

Provided is an electronic device that determines a final steering value and a final throttle value for controlling driving of a vehicle through a pre-trained first and second neural networks, and a method for operating the same.

10 Claims, 8 Drawing Sheets

(56) References Cited

U.S. PATENT DOCUMENTS

2020/0142421 A1   5/2020   Palanisamy et al.

FOREIGN PATENT DOCUMENTS

| KR | 102108953 | B1 | 5/2020 |
| KR | 102166811 | B1 | 10/2020 |
| WO | 2018125928 | A1 | 7/2018 |

* cited by examiner

ELECTRONIC DEVICE FOR CONTROLLING DRIVING OF VEHICLE AND OPERATION METHOD THEREOF

CROSS-REFERENCE TO RELATED APPLICATION(S)

This application claims the benefit of Korean Patent Application No. 10-2021-0050055, filed on Apr. 16, 2021, in the Korean Intellectual Property Office, the disclosure of which is incorporated herein by reference.

BACKGROUND

Field of the Invention

Example embodiments relate to an electronic device for controlling driving of a vehicle and a method of operating the same.

Description of the Related Art

Autonomous driving technology is one of the key technologies with promising future prospects. As a deep convolutional network makes a great contribution to improving object recognition accuracy, attempts to apply deep learning to autonomous driving are continuing.

As image data, RGB data of a camera or light detection and ranging ("Lidar") Lidar data of a Lidar sensor are mainly used, and each sensor has advantages and disadvantages. A camera image is affected by the amount of light. A camera image provides excellent information for recognizing objects in the image through color information, but because camera images are greatly affected by weather and brightness, predictive performance is often poor in dark or shady environments. The Lidar sensor may calculate the distance to points corresponding each other through the information received by transmitting the laser. Further, since the Lidar is an active sensor, it may operate even in an environment without light. However, compared to the camera data, the number of layers is quite small, and color information is not known, so it is difficult to distinguish the location and shape of the road on flat terrain.

SUMMARY

Accordingly, the embodiments of the present disclosure substantially obviate one or more problems due to limitations and disadvantages of the related art.

The embodiments provide systems, electronic devices, methods, and instructions for controlling driving of a vehicle. The solutions to technical problems achieved by example embodiments of the present disclosure are not limited to the technical problems described above, and other technical problems may be understood from the following example embodiments.

According to an aspect, there is provided a method for operating an electronic device for controlling driving of a vehicle, the method including acquiring first sensed data and second sensed data, determining a first reliability level, a first steering value, a first throttle value based on an output of a first neural network to which the first sensed data is input, and determining a second reliability level, a second steering value and a second throttle value based on an output of a second neural network to which the second sensed data is input, and based on the first reliability level and the second reliability, determining a final steering value for controlling driving of the vehicle from the first steering value and the second steering value, and determining a final throttle value for controlling driving of the vehicle from the first throttle value and the second throttle value.

According to another aspect, there is provided an electronic device for controlling driving of a vehicle, the electronic device including a memory in which at least one program is stored, and a processor configured to, by executing the at least one program, acquire first sensed data and second sensed data, determine a first reliability level, a first steering value and a first throttle value based on an output of a first neural network to which the first sensed data is input, and determine a second reliability level, a second steering value and a second throttle value based on an output of a second neural network to which the second sensed data is input, and based on the first reliability level and the second reliability level, determine a final steering value for controlling driving of the vehicle from the steering value and the second steering value, and determine a final throttle value for controlling driving of the vehicle from the first throttle value and the second throttle value.

According to another third aspect, there is provided a computer-readable recording medium includes a non-transitory recording medium recording a program for executing the above-described operating method on a computer.

According to example embodiments, the electronic device may calculate a final steering value and a final throttle value with higher reliability levels, since the electronic device, based on the first reliability level of the first neural network and the second reliability level of the second neural network, calculates a final steering value for controlling driving of the vehicle from the first steering value of a first neural network and the second steering value of a second neural network, and calculates a final throttle value for controlling driving of the vehicle from the first throttle value of the first neural network and the second throttle value of the second neural network. For example, in a situation where it is difficult to predict a steering value and a throttle value, the electronic device may determine a final steering value and a final throttle value by using data of the camera sensor and data of the Lidar sensor complementary to each other.

Further, the electronic device may determine a final steering value and a final throttle value through pre-trained first and second neural networks, and the electronic device may control a vehicle to travel in a drivable area through the determined final steering value and the final throttle value. For example, the vehicle may smoothly travel through the drivable area even on an unpaved road according to the final steering value and the final throttle value determined by the electronic device. For example, according to a final steering value and a final throttle value determined by the electronic device, a military vehicle may smoothly travel through a drivable area even in open or rough terrain.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

These and/or other aspects, features, and advantages of the invention will become apparent and more readily appre

DETAILED DESCRIPTION

Figure 1:
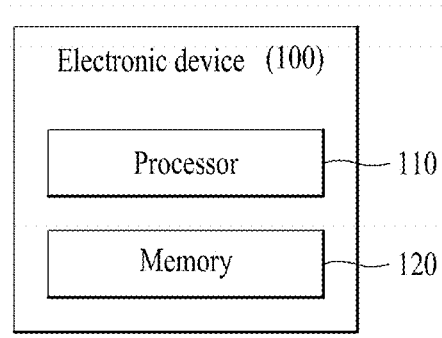
- FIG. 1 illustrates an electronic device according to the present disclosure.

Terms used in the example embodiments are selected as currently widely used general terms as possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Furthermore, terms such as " . . . unit," " . . . group," and " . . . module" described in the specification mean a unit that processes at least one function or operation, which may be implemented as hardware, software, or a combination thereof.

Expression "at least one of a, b and c" described throughout the specification may include "a alone," "b alone," "c alone," "a and b," "a and c," "b and c" or "all of a, b and c."

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

For the realization of autonomous driving, a method called imitation learning is mainly used. In the imitation learning, camera data, Lidar data, a steering value and a throttle value are recorded through manned driving. When an input image goes through all the operations of the deep convolutional neural network, a steering value and a throttle value are output. The steering value and the throttle value are also the only inputs for a human to drive a vehicle. The network learns in the direction of reducing the difference between label data corresponding to the image and an output value through a backpropagation algorithm. The trained network receives camera data or Lidar data and predicts pseudo-inferred values for labeled steering and throttle values to enable autonomous driving. According to an example embodiment, in the artificial neural network, one of 15 steering values and one of 20 throttle values may be selected and output.

Since cameras and the Lidar collect data in different ways, they may work complementary. Considering reliability levels of an output through a camera and an output through the Lidar, the performance of autonomous driving may be improved by fusion of the outputs. The present disclosure provides an algorithm that seeks to improve the performance of autonomous driving through the imitation learning by integrating camera data and Lidar sensor data, and finds an optimal combination based on measurement of reliability levels of the camera data and the Lidar data.

Hereinafter, example embodiments of the present disclosure will be described in detail with reference to the drawings.

FIG. 1 illustrates an electronic device according to the present disclosure.

An electronic device 100 includes a processor 110 and a memory 120. In FIG. 1 illustrating the electronic device 100, only components related to the example embodiment are illustrated. Therefore, it is apparent to those skilled in the art that the electronic device 100 may further include other general-purpose components in addition to the components illustrated in FIG. 1.

The electronic device 100 may control the driving of the vehicle. Specifically, the electronic device 100 may determine a steering value and a throttle value for driving the vehicle. For example, the electronic device 100 may control a steering part of the vehicle through the steering value, and may control the throttle of the vehicle through the throttle value. According to an example embodiment, the steering part may be a combination of mechanism configured to steer the vehicle. Further, the throttle may be a combination of mechanisms configured to control the operating speed of an engine/a motor to control the speed of the vehicle. Further, the throttle may control the amount of mixed gas of fuel air flowing into the engine/motor by adjusting the throttle opening amount, and power and thrust may be controlled by adjusting the throttle opening amount. According to an example embodiment, the electronic device 100 may be included in a vehicle and may implement an autonomous driving function of the vehicle.

The processor 110 serves to control overall functions for driving a vehicle in the electronic device 100. For example, the processor 110 generally controls the electronic device 100 by executing programs stored in the memory 120 in the electronic device 100. The processor 110 may be implemented as a central processing unit (CPU), a graphics processing unit (GPU) or an application processor (AP) included in the electronic device 100. However, the processor 110 is not limited thereto.

The memory 120 is hardware for storing various data processed in the electronic device 100, and the memory 120 may store data processed and data to be processed by the electronic device 100. Further, the memory 120 may store applications to be driven by the electronic device 100 and drivers. The memory 120 may include random access memory (RAM), such as dynamic random access memory (DRAM), static random access memory (SRAM), read-only memory (ROM), electrically erasable programmable read-only memory (EEPROM), CD-ROM, Blu-ray or other optical disk storage, hard disk drive (HDD), solid state drive (SSD) or flash memory.

The processor 110 may acquire first sensed data and second sensed data. According to an example embodiment, the processor 110 may acquire the first sensed data from an image sensor and may acquire the second sensed data from the Lidar sensor. For example, the first sensed data may be two-dimensional image data acquired from the image sensor, or the image data may be data processed through segmentation. The second sensed data may be two-dimensional image data acquired by processing the Lidar data acquired from the Lidar sensor through a road direction network. According to another example embodiment, the processor 110 may acquire the first sensed data and the second sensed data from the image sensor. Here, the first sensed data may be image data acquired from the image sensor, and the second sensed data may be data acquired by processing image data through segmentation.

Figure 2:
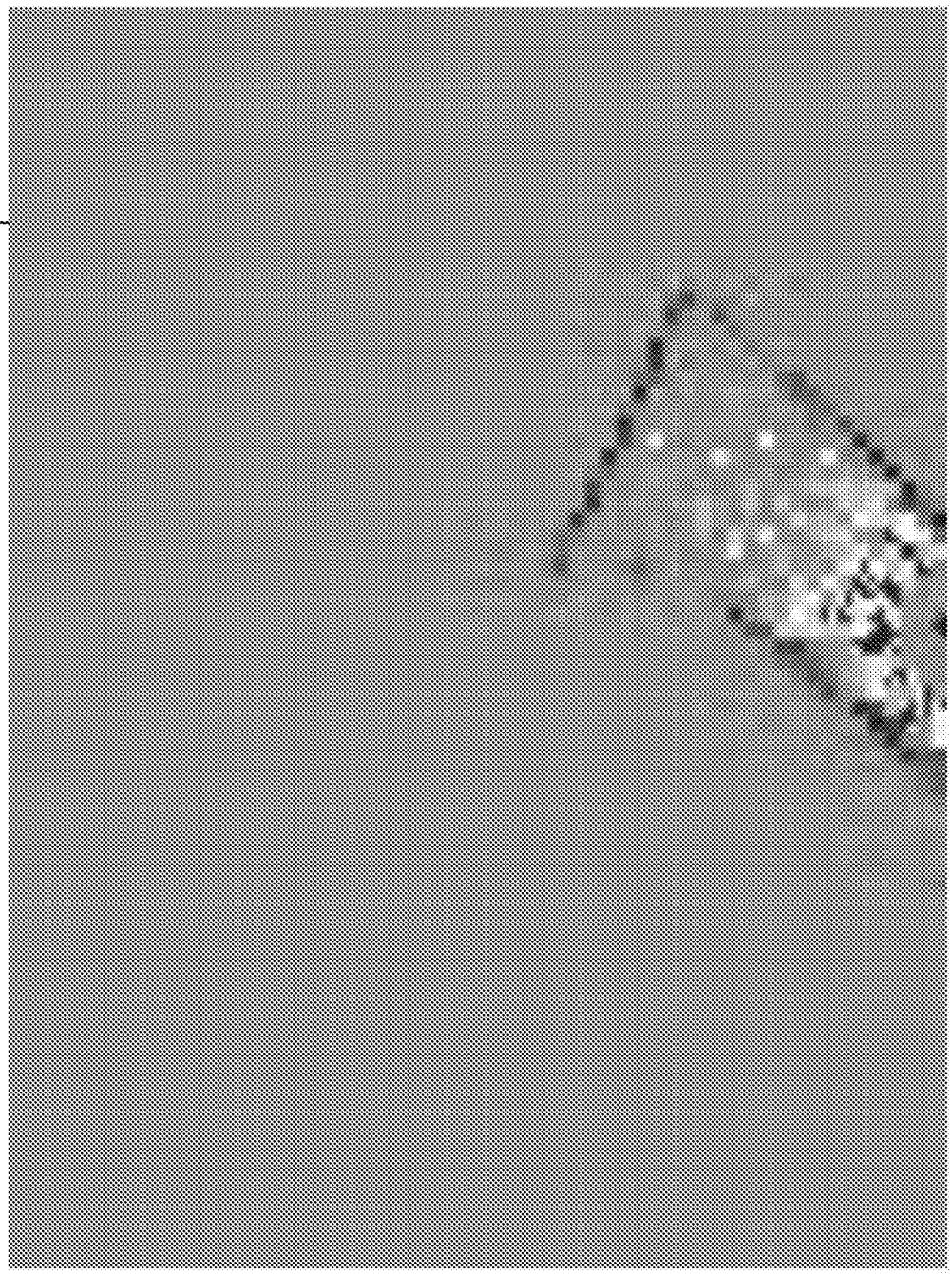
FIG. 2 shows a two-dimensional image in which Lidar data is processed.

FIG. 2 shows a two-dimensional image in which Lidar data is processed.

A two-dimensional image 210 of FIG. 2 represents a two-dimensional image obtained by processing Lidar data. The Lidar data acquired from the Lidar sensor may be converted into a two-dimensional image in which each pixel value indicates a road (1) or a non-road (0) through a pre-trained road detection network. Here, the road detection network may be a neural network in which a point cloud, which is input information, is trained to distinguish a road from a non-road. The two-dimensional image may be in a form that is easy for the neural network to estimate a steering value and a throttle value.

Figure 3:
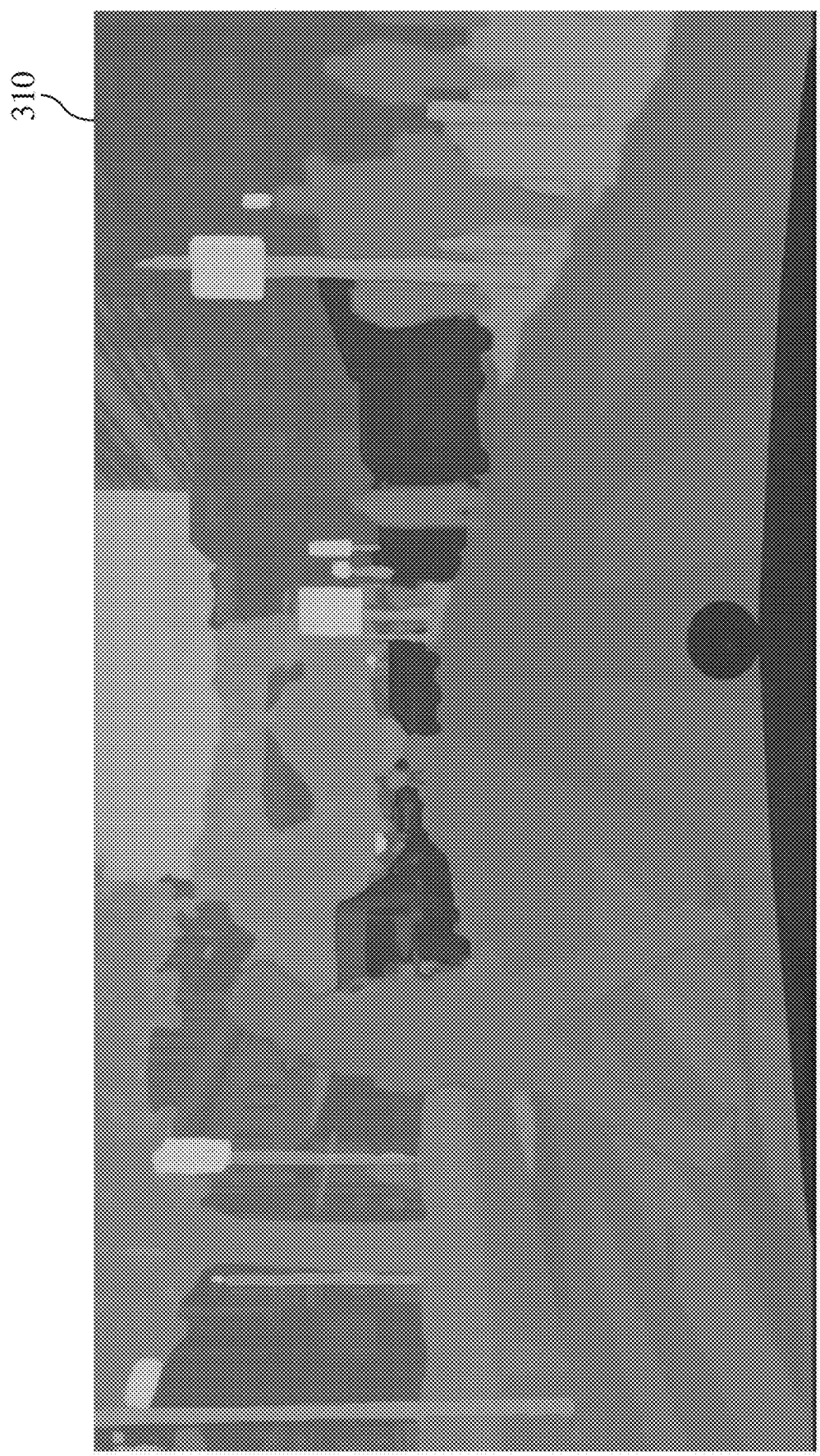
FIG. 3 shows an image processed through segmentation.

FIG. 3 shows an image processed through segmentation.

An image 310 of FIG. 3 represents an image acquired by processing image data acquired from a camera. Specifically, the image data acquired from the camera may be segmented through a pre-trained neural network, and converted into a two-dimensional image partitioned for each object. For example, image data acquired from a camera may be converted into a two-dimensional image in which objects such as trees, roads, and signs are displayed in different colors through the pre-trained neural network and classified.

Referring back to FIG. 1, according to the example embodiment, the processor 110 may acquire first sensed data and second sensed data from the outside through a communication device within the electronic device 100. According to another example embodiment, the processor 110 may acquire first sensed data and second sensed data from the memory 120.

The processor 110 may determine a first reliability level, a first steering value and a first throttle value from a first neural network to which the first sensed data is input, and may determine a second reliability level, a second steering value and a second throttle value from a second neural network to which the second sensed data is input. The first neural network may be trained to infer a steering value and a throttle value for a vehicle to drive in a drivable area. In other words, the first neural network may be trained to infer a steering value and a throttle value for driving the vehicle in the drivable area based on the first sensed data. Specifically, when the first sensed data, and the steering value and the throttle value corresponding to the first sensed data are acquired while the vehicle travels in the drivable area, the first neural network may be a convolutional neural network learned or trained based on the first sensed data which is input information and the steering value and the throttle value which are target information for the input information. Similarly, the second neural network may also be trained to infer the steering value and the throttle value for the vehicle to drive in the drivable area. In other words, the second neural network may be trained to infer the steering value and the throttle value for driving the vehicle in the drivable area based on the second sensed data. Specifically, when the second sensed data, and the steering value and the throttle value corresponding to the second sensed data are acquired while the vehicle travels in the drivable area, the second neural network may be a convolutional neural network learned or trained based on the second sensed data which is input information and the steering value and the throttle value which are target information for the input information. Here, the drivable area may indicate a paved road according to the example embodiment, or may indicate an area in which a vehicle may drive among unpaved roads according another example embodiment. For example, the drivable area may be a mountain road, a dirt road, or a gravel road among unpaved roads.

The processor 110 may calculate a first reliability level for the first sensed data from the first neural network to which the first sensed data is input, and may calculate a second reliability level for the second sensed data from the second neural network to which the second sensed data is input. Specifically, the processor 110 may calculate a first reliability level based on outputs of a softmax layer of the first neural network, and the processor 110 may calculate a second reliability level based on outputs of a softmax layer of the second neural network.

According to an example embodiment, the processor 110 may calculate the reliability levels according to Equations 1 and 2 below.

$$H = -\sum_{i=1}^{n} p_i \log(p_i) \quad \text{[Equation 1]}$$

$$\gamma = \frac{1}{H + \epsilon} = \frac{1}{-\sum_{i=1}^{n} p_i \log(p_i) + \epsilon} \quad \text{[Equation 2]}$$

In Equations 1 and 2, $p_i$ represents an i-th output value among n output values of the softmax layer of the neural network. Therefore, the processor 110 may calculate entropy H through Equation 1, and calculate reliability level $\gamma$ as a reciprocal of entropy H through Equation 2. Here, $\epsilon$ is a minimum value for preventing division by zero, and may be set to, for example, 0.00001. Further, $p_i$ may be calculated according to Equation 3 below. In Equation 3, $z_i$ represents the i-th value input to the softmax layer.

$$p_i = softmax(z_i) = \frac{e^{z_i}}{\sum_i e^{z_i}} \quad \text{[Equation 3]}$$

According to another example embodiment, the processor 110 may calculate reliability level $\gamma$ according to Equation 4 below.

$$\gamma = \frac{1}{-\log(\max(p_i))} \quad \text{[Equation 4]}$$

In Equation 4, $\max(p_i)$ represents the largest value among n output values of the softmax layer of the neural network.

The processor 110 determines a first steering value and a first throttle value based on an output of the first neural network, and may determine a second steering value and a second throttle value based on an output of the second neural network. For example, the processor 110 may determine steering value α and throttle value β according to Equation 5 below (a categorical model).

$$\alpha = \alpha^i \text{ where } i = \operatorname{argmax}(p_i)$$

$$\beta = \beta^i \text{ where } i = \operatorname{argmax}(p_i) \quad \text{[Equation 5]}$$

In Equation 5, steering value α represents the i-th candidate steering value in which $p_i$, the output value of the softmax layer, is the highest among the candidate steering values that are outputs of the neural network, and throttle value $p_i$ represents the i-th candidate throttle value having the highest $p_i$, which is the output value of the softmax layer, among candidate throttle values that are outputs of the neural network.

Figure 4:
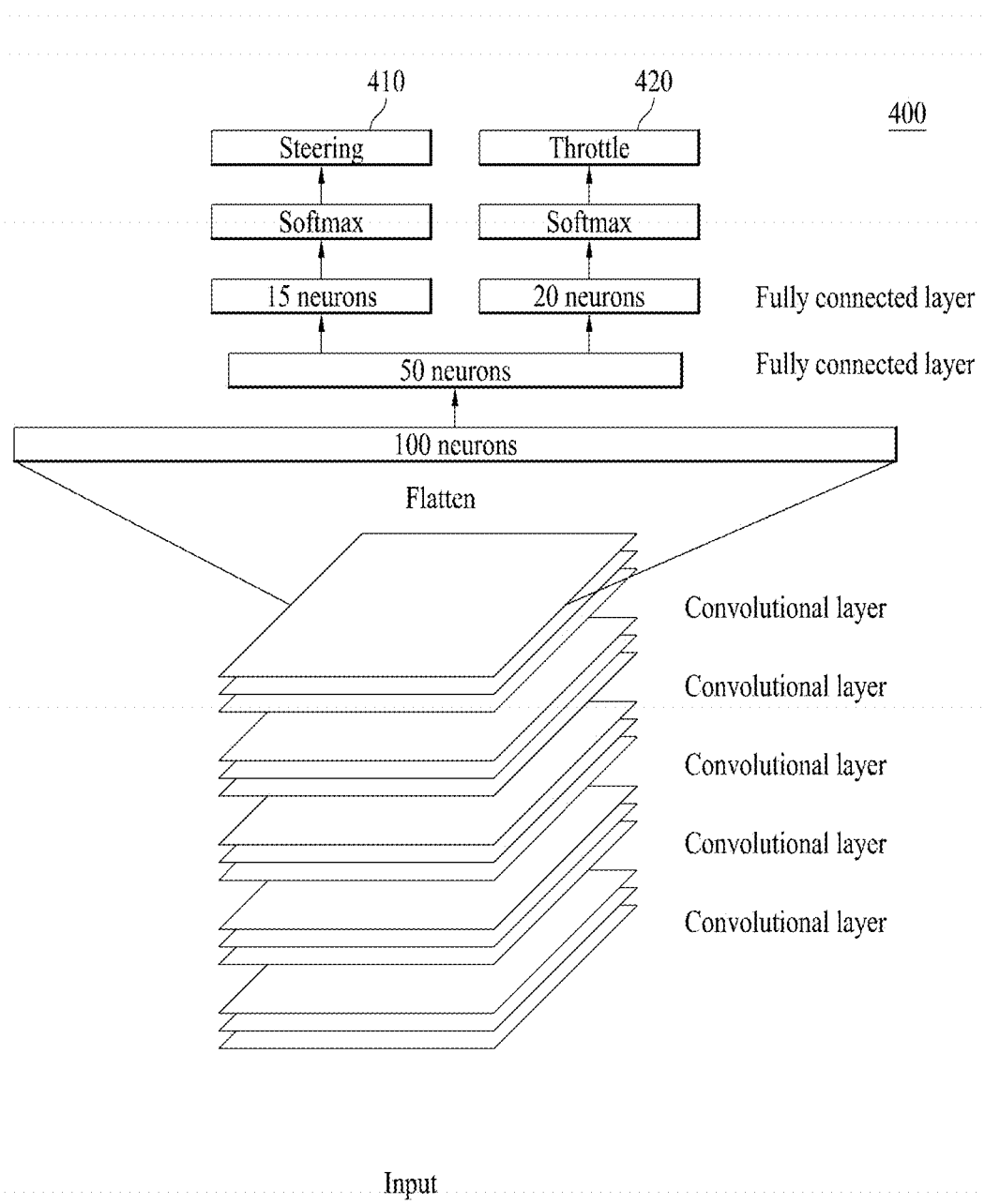
FIG. 4 illustrates a convolutional neural network that is an example of a neural network.

FIG. 4 illustrates a convolutional neural network that is an example of a neural network.

As illustrated in FIG. 4, a convolutional neural network 400 may include convolutional layers, fully connected layers, and softmax layers. Further, the convolutional neural network 400 may be a neural network trained based on sensed data as input information and a steering value and a throttle value as target information for the input information. Further, a flatten function may be used in the convolutional neural network 400, and here, the flatten function may indicate a function that changes the shape of data (tensor). For example, the flatten function may change 200×200×1 data to 40000×1 data.

According to an example embodiment, the convolutional neural network 400 to which the sensed data is input may output 15 candidate steering values through 15 neurons, and may output 20 candidate throttle values through 20 neurons. The processor 110 may determine a candidate steering value having the highest output value of the softmax layer among the 15 candidate steering values as a steering value 410, and may determine a candidate throttle value having the highest output value of the softmax layer as a throttle value 420 among the 20 candidate throttle values.

Further, the processor 110 may calculate a reliability level of input sensed data based on the outputs of the softmax layers of the convolutional neural network 400. According to an example embodiment, the processor 110 may calculate a reliability level of the sensed data by calculating the entropy of the outputs of the softmax layer corresponding to the 15 neurons. In other words, the processor 110 may determine the reliability level of the steering value 410 as the reliability level of the sensed data. According to another example embodiment, the processor 110 may calculate a reliability level of the sensed data by calculating the entropy of the outputs of the softmax layer corresponding to the 20 neurons. In other words, the processor 110 may determine the reliability level of the throttle value 420 as the reliability level of the sensed data. According to another example embodiment, the processor 110 may determine a reliability level of the sensed data using the reliability level of the steering value 410 and the reliability level of the throttle value 420. For example, the processor 110 may determine an average value of the reliability level of the steering value 410 and the reliability level of the throttle value 420 as the reliability level of the sensed data, or may determine a lower value of the reliability level of the steering value 410 and the reliability level of the throttle value 420 as the reliability level of the sensed data.

Figure 5:
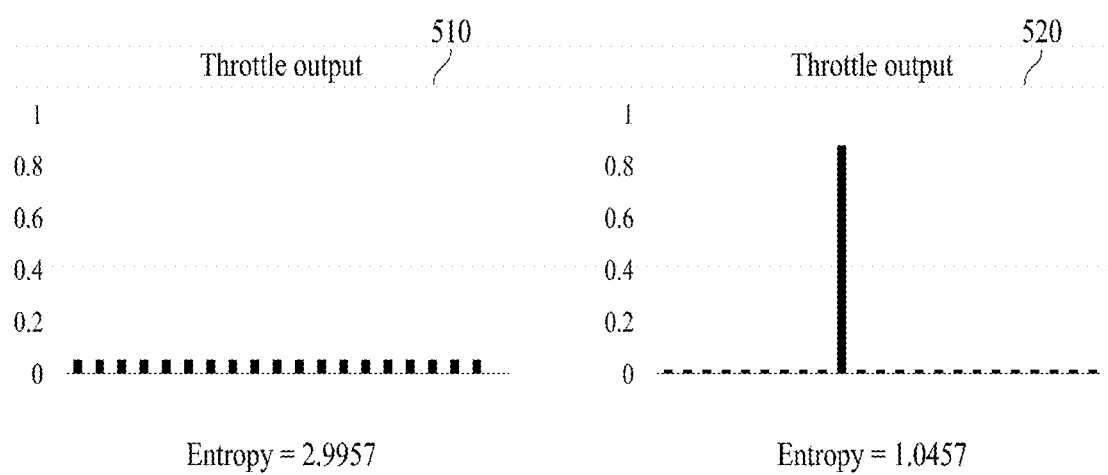
FIG. 5 illustrates examples of entropy for outputs of a neural network.

FIG. 5 illustrates examples of entropy for outputs of a neural network.

A left graph 510 represents output values of the softmax layer of the neural network. Specifically, the left graph 510 indicates $p_i$s for candidate throttle values, and indicates that $p_i$s are all equally constant values. In this case, the entropy is calculated as a relatively large value of 2.9957, which may indicate that the reliability level of sensed data input to the neural network is low.

A right graph 520 represents output values of the softmax layer of the neural network. Specifically, the right graph 520 indicates $p_i$s for candidate throttle values, and indicates that $p_i$ for a particular candidate throttle value is high. In this case, the entropy is calculated as a relatively small value of 1.0457, which may indicate that the reliability level of the sensed data input to the neural network is high.

Referring back to FIG. 1, the processor 110 may determine a final steering value for controlling the driving of the vehicle from the first steering value and the second steering value based on the first reliability level and the second reliability level, and the processor 110 may determine a final throttle value for controlling the driving of the vehicle from the first throttle value and the second throttle value based on the first reliability level and the second reliability level.

According to an example embodiment, the processor 110 may assign a weight to each of the first steering value and the second steering value according to the ratio of the first reliability level and the second reliability level, and the processor 110 may determine a final steering value from the weighed first steering value and the second steering value. Similarly, the processor 110 may assign a weight to each of the first throttle value and the second throttle value according to the ratio of the first reliability level and the second reliability level, and the processor 110 may determine a final throttle value from the weighed first throttle value and the second throttle value.

For example, the processor 110 may determine final steering value $\alpha_{fusion}$ and final throttle value $\beta_{fusion}$ according to Equation 6 below.

$$\alpha_{fusion} = \frac{\gamma_{camera}}{\gamma_{camera} + \gamma_{lidar}} \alpha_{camera} + \frac{\gamma_{lidar}}{\gamma_{camera} + \gamma_{lidar}} \alpha_{lidar} \quad \text{[Equation 6]}$$

$$\beta_{fusion} = \frac{\gamma_{camera}}{\gamma_{camera} + \gamma_{lidar}} \beta_{camera} + \frac{\gamma_{lidar}}{\gamma_{camera} + \gamma_{lidar}} \beta_{lidar}$$

In Equation 6, $\gamma_{camera}$ may represent a first reliability level, and $\gamma_{lidar}$ may represent a second reliability level. For example, the first reliability level may indicate the reliability level of first sensed data acquired from a camera, and the second reliability level may indicate the reliability level of second sensed data acquired from a Lidar sensor. Further, in Equation 6, $\alpha_{camera}$ may represent a first steering value, $\alpha_{lidar}$ may represent a second steering value, $\beta_{camera}$ may represent a first throttle value, and $\beta_{lidar}$ may represent a second throttle value. Therefore, the processor 110 may determine a final steering value by fusing the first and second steering values weighed according to the ratio of the first reliability level and the second reliability level, and determine a final throttle value by fusing the first and second throttle values weighed according to the ratio of the first reliability level and the second reliability level.

According to another example embodiment, the processor 110 may determine any one of the first steering value and the second steering value as the final steering value through the magnitude comparison between the first reliability level and the second reliability level, and the processor 110 may determine any one of the first throttle value and the second throttle value as the final throttle value through the magnitude comparison between the first reliability level and the second reliability level.

For example, the processor 110 may determine final steering value $\alpha_{fusion}$ and final throttle value $\beta_{fusion}$ according to Equation 7 below.

$$\alpha_{fusion} = \begin{cases} \alpha_{camera} & \text{if } \gamma_{camera} > \gamma_{lidar} \\ \alpha_{lidar} & \text{else} \end{cases} \quad \text{[Equation 7]}$$

$$\beta_{fusion} = \begin{cases} \beta_{camera} & \text{if } \gamma_{camera} > \gamma_{lidar} \\ \beta_{lidar} & \text{else} \end{cases}$$

In Equation 7, $\gamma_{camera}$ may represent a first reliability level and $\gamma_{lidar}$ may represent a second reliability level. For example, the first reliability level may indicate a reliability level of first sensed data acquired from a camera, and a second reliability level may indicate a reliability level of second sensed data acquired from a Lidar sensor. In Equation 7, $\alpha_{camera}$ may represent a first steering value, $\alpha_{lidar}$ may represent a second steering value, $\beta_{camera}$ may represent a first throttle value, and $\beta_{lidar}$ may represent a second throttle value. Therefore, the processor 110 may determine a steering value or a throttle value acquired from sensed data with a high reliability level as a final steering value or a final throttle value according to the magnitude comparison between a first reliability level and a second reliability level.

According to an example embodiment, the first reliability level may include a 1-1 reliability level with respect to the first steering value and a 1-2 reliability level with respect to the first throttle value, and the second reliability level may include a 2-1 reliability level with respect to the second steering value and a 2-2 reliability level for the second throttle value. Accordingly, the processor 110 may determine a first steering value from the first steering value and the second steering value based on the 1-1 reliability level and the 2-1 reliability level, and determine a final throttle value from the first throttle value and the second throttle value based on the 1-2 reliability level and the 2-2 reliability level. Accordingly, the processor 110 may assign a weight to each of the first steering value and the second steering value according to the ratio of the 1-1 reliability level and the 2-1 reliability level, and determine a final steering value from the weighed first and second steering values. Further, the processor 110 may assign a weight to each of the first throttle value and the second throttle value according to the ratio of the 1-2 reliability level and the 2-2 reliability level, and determine a final throttle value from the weighed first and second throttle values. In another example embodiment, the processor 110 may determine any one of the first steering value and the second steering value as the final steering value through the magnitude comparison between the 1-1 reliability level and the 2-1 reliability level, and may determine any one of the first throttle value and the second throttle value as the final throttle value by comparing the magnitude of the 1-2 reliability level and the 2-2 reliability level.

According to an example embodiment, the processor 110 may determine a final steering value by fusing the first steering value and the second steering value, and determine a final throttle value by fusing the first throttle value and the second throttle value. For example, the processor 110 may determine the final steering value through an average of the first steering value and the second steering value, and determine the final throttle value through an average of the first throttle value and the second throttle value. Further, although it is very dark, if there are trees or fences that separate the road from the non-road, the Lidar may be more reliable than a camera, and thus the processor 110 may determine a final steering value and a final throttle value through second sensed data based on the Lidar rather than first sensed data based on the camera.

The electronic device 100 may determine a final steering value and a final throttle value through a pre-trained first neural network and a pre-trained second neural network, and may control the vehicle to travel in a drivable area through the determined final steering value and the determined final throttle value. For example, the vehicle may smoothly travel through the drivable area even on an unpaved road according to the final steering value and the final throttle value determined by the electronic device 100. Further, a military vehicle may smoothly travel through a drivable area even in open or rough terrain according to the final steering value and the final throttle value determined by the electronic device 100.

Figure 6:
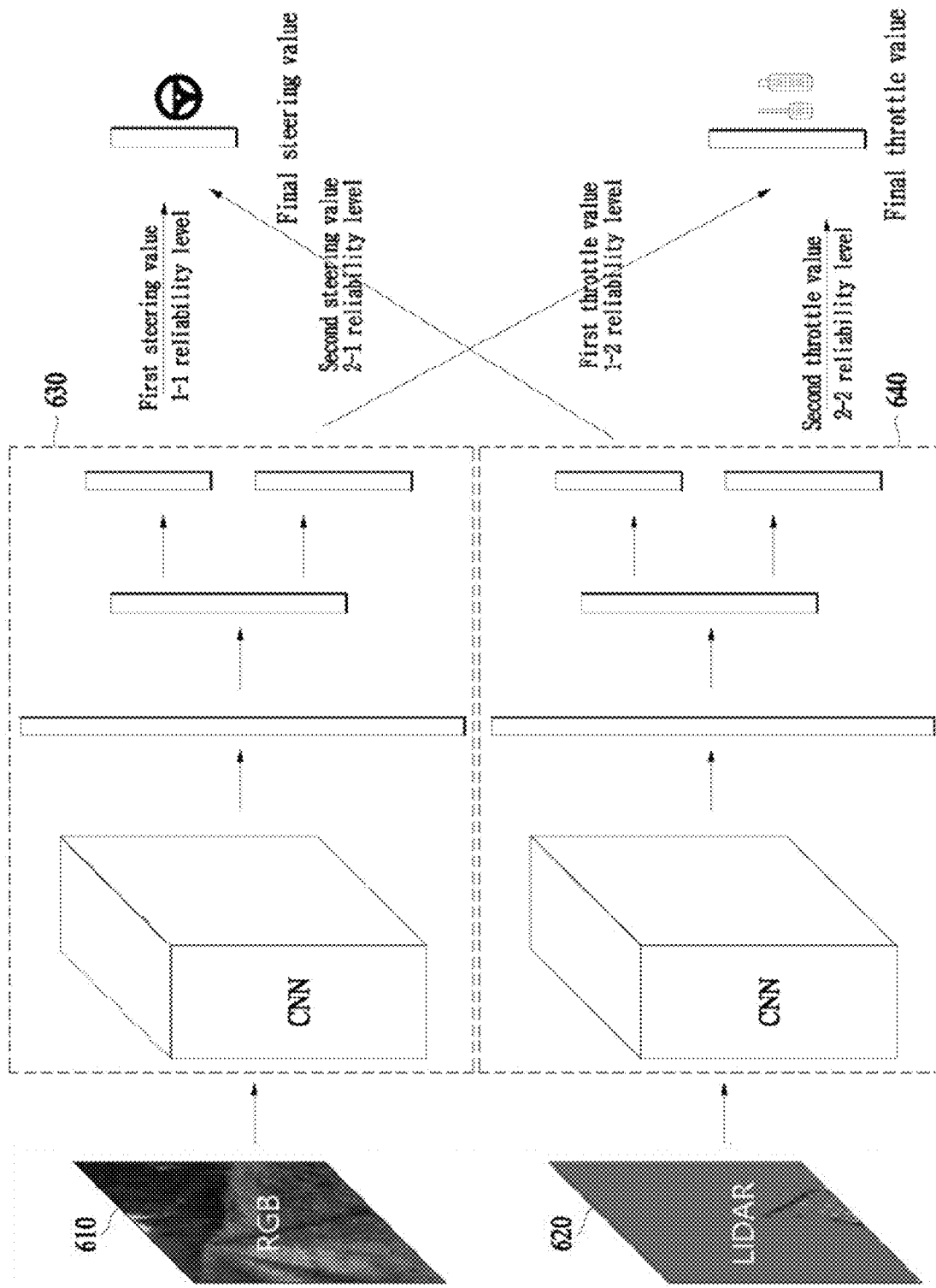
FIG. 6 illustrates example embodiments in which a processor determines a final steering value and a final throttle value.

FIG. 6 illustrates example embodiments in which a processor determines a final steering value and a final throttle value.

The processor 110 may determine a first steering value and a first throttle value based on an output of a neural network 630 to which first sensed data 610 is input, and may determine a 1-1 reliability level for the first steering value and a 1-2 reliability level for the first throttle value. Further, the processor 110 may determine a second steering value and a second throttle value based on an output of a neural network 640 to which second sensed data 620 is input, and may determine a 2-1 reliability level for the second steering value and a 2-2 reliability level for the second throttle value.

The processor 110 may determine a final steering value from the first steering value and the second steering value based on the 1-1 reliability level and the 2-1 reliability level, and may determine a final throttle value from the first throttle value and the second throttle value based on the 1-2 reliability level and the 2-2 reliability level. For example, the processor 110 may determine a final steering value from the first steering value and the second steering value according to the ratio of the 1-1 reliability level and the 2-1 reliability level or the magnitude comparison between the 1-1 reliability level and the 2-1 reliability level, and the processor 110 may determine a final throttle value form the first throttle value and the second throttle value according to the ratio of the 1-2 reliability level and the 2-2 reliability level or the magnitude comparison of the 1-2 reliability level and the 2-2 reliability level.

Figure 7:
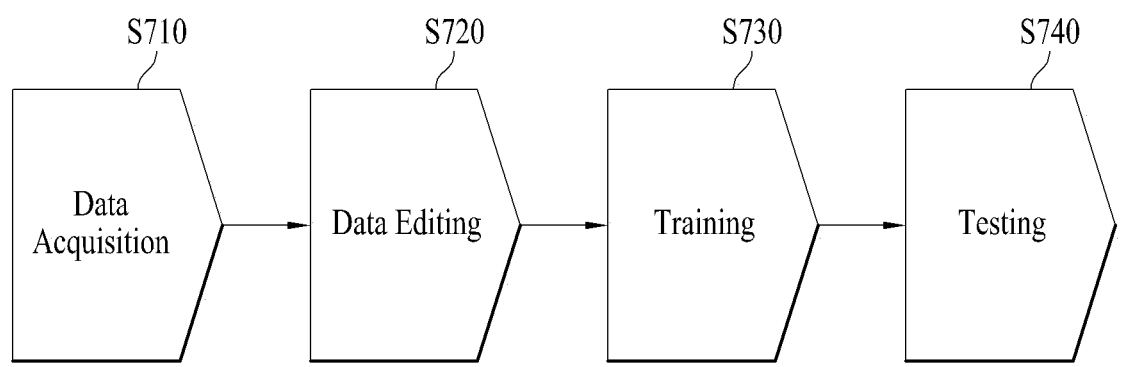
FIG. 7 illustrates an example embodiment in which an electronic device operates.

FIG. 7 illustrates an example embodiment in which an electronic device operates.

The electronic device 100 may acquire data from sensors for data acquisition in operation S710. For example, the electronic device 100 may acquire image data from a camera and may acquire Lidar data from a Lidar sensor. According to an example embodiment, the electronic device 100 may acquire image data and Lidar data while the vehicle is driving, and may also acquire a steering value and a throttle value measured while the vehicle is driving.

The electronic device 100 may edit the data acquired in operation S710 and remove a portion that is not necessary for training a neural network for data editing in operation S720. For example, the electronic device 100 may edit image data, Lidar data, steering values and throttle values acquired while driving a vehicle in order to train a neural network.

The electronic device 100 may train the neural network based on the data edited in operation S720 for training in operation S730. Specifically, the electronic device 100 may train the neural network through image data and Lidar data which are input information, and a steering value and a throttle value which are target information or labels for the input information. For example, the electronic device 100 may train a first convolutional neural network through image data as input information and a steering value and a throttle value as labels, and the electronic device 100 may train a second convolutional neural network using Lidar data as input information and a steering value and a throttle value as labels.

For testing, the electronic device 100 may determine a final steering value and a final throttle value for driving the vehicle using the neural networks trained in S730, and the electronic device 100 may identify whether the vehicle traveling normally drives according to the final steering value and the final throttle value in operation S740. For example, the electronic device 100 may determine whether the vehicle travels off the road.

Figure 8:
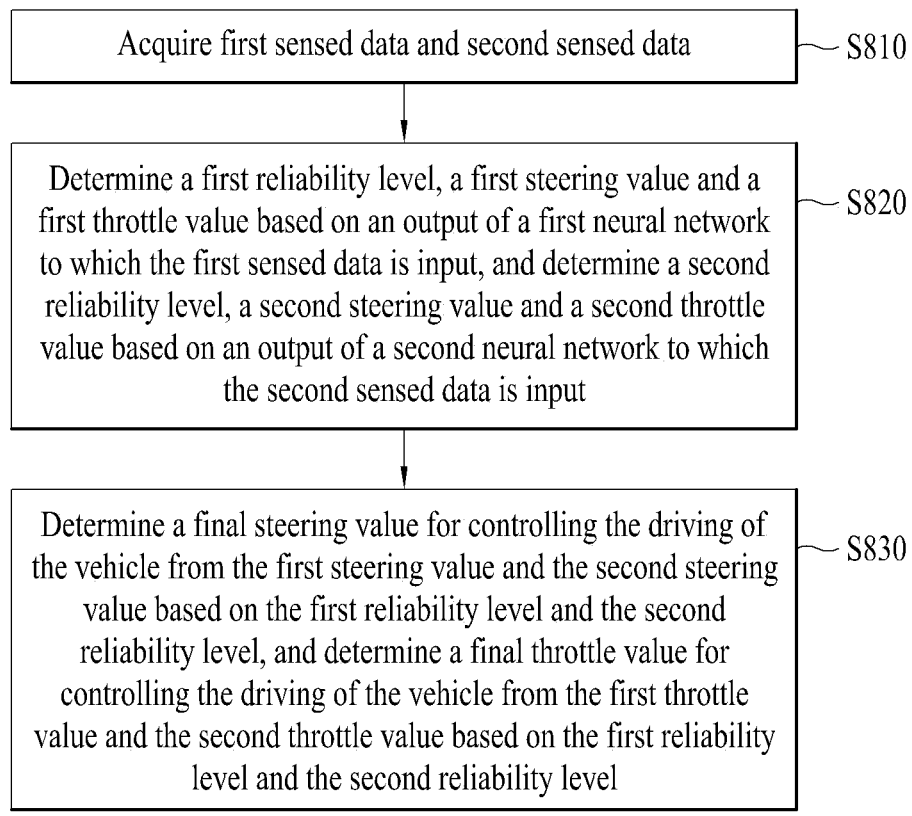
FIG. 8 is a flowchart illustrating a method of operating an electronic device according to an example embodiment.

FIG. 8 is a flowchart illustrating a method of operating an electronic device according to an example embodiment.

Since each step of the operation method of FIG. 8 may be performed by the electronic device 100 of FIG. 1, a description of content overlapping with those of FIG. 8 will be omitted.

The electronic device 100 may acquire first sensed data and second sensed data in operation S810.

The electronic device 100 may determine a first reliability level, a first steering value and a first throttle value based on an output of a first neural network to which the first sensed data is input, and the electronic device 100 may determine a second reliability level, a second steering value and a second throttle value based on an output of a second neural network to which the second sensed data is input in operation S820.

The first neural network may be a convolutional neural network trained to output a steering value and a throttle value for driving a vehicle in a drivable area from the first sensed data, and the second neural network may be a convolutional neural network trained to output a steering value and a throttle value for driving a vehicle in a drivable area from the second sensed data. The first reliability level may be calculated based on outputs of the softmax layer of the first neural network, and the second reliability level may be calculated based on outputs of the softmax layer of the second neural network.

The electronic device 100 may determine a final steering value for controlling the driving of the vehicle from the first steering value and the second steering value based on the first reliability level and the second reliability level, and the electronic device 100 may determine a final throttle value for controlling the driving of the vehicle from the first throttle value and the second throttle value based on the first reliability level and the second reliability level in operation S830.

The electronic device 100 may assign a weight to each of the first steering value and the second steering value according to the ratio of the first reliability level and the second reliability level, and determine a final steering value from the weighed first steering value and the weighed second steering value, and the electronic device 100 may assign a weight to each of the first throttle value and the second throttle value according to the ratio of the first reliability level and the second reliability level, and determine a final throttle value from the weighed first throttle value and the weighed second throttle value.

The electronic device 100 may determine any one of the first steering value and the second steering value as the final steering value through the magnitude comparison between the first reliability level and the second reliability level, and the electronic device 100 may determine one of the first throttle value and the second throttle value as the final throttle value through the magnitude comparison.

The first reliability level may include a 1-1 reliability level with respect to the first steering value and a 1-2 reliability level with respect to the first throttle value, and the second reliability level may include a 2-1 reliability level with respect to the second steering value and a 2-2 reliability level with respect to the second throttle value. The electronic device 100 may determine a final steering value from the first steering value and a second steering value based on the 1-1 reliability level and the 2-1 reliability level, and the electronic device 100 may determine a final throttle value from the first throttle value and the second throttle value based on the 1-2 reliability level and the 2-2 reliability level.

According to an example embodiment, first sensing data may be data acquired from an image sensor, and second sensed data may be data acquired from a Lidar sensor. According to another example embodiment, the second sensed data may be two-dimensional image data acquired by processing the Lidar data acquired from the Lidar sensor through a road detection network. According to another example embodiment, the first sensed data may be data acquired by processing image data acquired from an image sensor through segmentation. According to another example embodiment, the first sensed data may be image data acquired from an image sensor, and the second sensed data may be data acquired by processing the image data through segmentation.

The electronic device according to the above-described example embodiments may include a processor, a memory for storing and executing program data, a permanent storage such as a disk drive, and a user interface device such as a communication port, a touch panel, a key and a button that communicates with an external device. Methods implemented as software modules or algorithms may be stored in a computer-readable recording medium as computer-readable codes or program instructions executable on the processor. Here, the computer-readable recording medium includes a magnetic storage medium (for example, ROMs, RAMs, floppy disks and hard disks) and an optically readable medium (for example, CD-ROMs and DVDs). The computer-readable recording medium may be distributed among network-connected computer systems, so that the computer-readable codes may be stored and executed in a distributed manner. The medium may be readable by a computer, stored in a memory, and executed on a processer.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and look-up table, that may execute various functions by the control of one or more microprocessors or other control devices. Similar to that elements may be implemented as software programming or software elements, the example embodiments may be implemented in a programming or scripting language such as C, C++, Java, assembler, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as "mechanism," "element," "means" and "configuration" may be used broadly and are not limited to mechanical and physical elements. The terms may include the meaning of a series of routines of software in association with a processor or the like.

It will be apparent to those skilled in the art that various modifications and variations can be made in the embodiments of the present invention without departing form the spirit or scope of the invention. Thus, it is intended that the present invention cover the modifications and variations of this invention provided they come within the scope of the appended claims and their equivalents.

What is claimed is:

1. A method for operating an electronic device for controlling driving of a vehicle, the method comprising:
    acquiring first sensed data and second sensed data;
    determining a first reliability level, a first steering value, a first throttle value based on an output of a first neural network to which the first sensed data is input, and determining a second reliability level, a second steering value and a second throttle value based on an output of a second neural network to which the second sensed data is input; and
    determining a final steering value for controlling driving of the vehicle from the first steering value and the second steering value based on the first reliability level and the second reliability level, and determining a final throttle value for controlling driving of the vehicle from the first throttle value and the second throttle value based on the first reliability level and the second reliability level,
    wherein the first neural network is a convolutional neural network trained to output a steering value and a throttle value for driving the vehicle in a drivable area based on first sensed data,
    wherein the second neural network is a convolutional neural network trained to output a steering value and a throttle value for driving the vehicle in a drivable area based on second sensed data,
    wherein the first reliability level is calculated based on outputs of a softmax layer of the first neural network, and
    wherein the second reliability level is calculated based on outputs of a softmax layer of the second neural network.

2. The method of claim 1, wherein the determining the final steering value and the final throttle value includes:
    weighing each of the first steering value and the second steering value according to a ratio of the first reliability level and the second reliability level, and determining the final steering value from a weighed first steering value and a weighed second steering value; and
    weighing each of the first throttle value and the second throttle value according to a ratio of the first reliability level and the second reliability level, and determining the final throttle value from a weighed first throttle value and a weighed second throttle value.

3. The method of claim 1, wherein the determining the final steering value and the final throttle value includes:
    determining any one of the first steering value and the second steering value as the final steering value through a magnitude comparison between the first reliability level and the second reliability level, and determining one of the first throttle value and the second throttle value as the final throttle value through the magnitude comparison.

4. The method of claim 1, wherein the first reliability level includes a 1-1 reliability level with respect to the first steering value and a 1-2 reliability level with respect to the first throttle value,
    wherein the second reliability level includes a 2-1 reliability level with respect to the second steering value and a 2-2 reliability level with respect to the second throttle value, and
    wherein the determining the final steering value and the final throttle value includes determining the final steering value from the first steering value and the second steering value based on the 1-1 reliability level and the 2-1 reliability level, and determining the final throttle value from the first throttle value and the second throttle value based on the 1-2 reliability level and the 2-2 reliability level.

5. The method of claim 1, wherein the first sensed data is data acquired from an image sensor, and the second sensed data is data acquired from a Lidar sensor.

6. The method of claim 5, wherein the second sensed data is two-dimensional image data acquired by processing Lidar data acquired from the Lidar sensor through a road detection network.

7. The method of claim 5, wherein the first sensed data is data acquired by processing image data acquired from an image sensor through segmentation.

8. The method of claim 1, wherein the first sensed data is image data acquired from an image sensor, and the second sensed data is data acquired by processing the image data through segmentation.

9. An electronic device for controlling driving of a vehicle, the electronic device comprising:
    a memory in which at least one program is stored; and
    a processor configured to:
    by executing the at least one program, acquire first sensed data and second sensed data,
    determine a first reliability level, a first steering value and a first throttle value based on an output of a first neural network to which the first sensed data is input, and determine a second reliability level, a second steering value and a second throttle value based on an output of a second neural network to which the second sensed data is input, and
    determine a final steering value for controlling driving of the vehicle from the first steering value and the second steering value based on the first reliability level and the second reliability level, and determine a final throttle value for controlling driving of the vehicle from the first throttle value and the second throttle value based on the first reliability level and the second reliability level,
    wherein the first neural network is a convolutional neural network trained to output a steering value and a throttle value for driving the vehicle in a drivable area based on first sensed data,
    wherein the second neural network is a convolutional neural network trained to output a steering value and a throttle value for driving the vehicle in a drivable area based on second sensed data,
    wherein the first reliability level is calculated based on outputs of a softmax layer of the first neural network, and
    wherein the second reliability level is calculated based on outputs of a softmax layer of the second neural network.

10. A non-transitory computer-readable recording medium on which a program for executing a method for operating an electronic device for controlling driving of a vehicle on a computer is recorded, wherein the method includes:

acquiring first sensed data and second sensed data;

determining a first reliability level, a first steering value and a first throttle value based on an output of a first neural network to which the first sensed data is input, and determining a second reliability level, a second steering value and a second throttle value based on an output of a second neural network to which the second sensed data is input; and determining a final steering value for controlling driving of the vehicle from the first steering value and the second steering value based on the first reliability level and the second reliability level, and determining a final throttle value for controlling driving of the vehicle from the first throttle value and the second throttle value based on the first reliability level and the second reliability level, wherein the first neural network is a convolutional neural network trained to output a steering value and a throttle value for driving the vehicle in a drivable area based on first sensed data, wherein the second neural network is a convolutional neural network trained to output a steering value and a throttle value for driving the vehicle in a drivable area based on second sensed data, wherein the first reliability level is calculated based on outputs of a softmax layer of the first neural network, and wherein the second reliability level is calculated based on outputs of a softmax layer of the second neural network.

* * * * *